(12) United States Patent
Bingham et al.

(10) Patent No.: US 12,092,148 B2
(45) Date of Patent: Sep. 17, 2024

(54) FASTENING SYSTEM, AND METHODS OF MAKING AND USING THE SYSTEM

(71) Applicant: Rigidcore Group LLC, Canton, CT (US)

(72) Inventors: Robert J. Bingham, Canton, CT (US); Emanuel Guzman, Sarasota, FL (US)

(73) Assignee: RigidCore Group LLC, Canton, CT (US)

( * ) Notice: Subject to any disclaimer, the term of this patent is extended or adjusted under 35 U.S.C. 154(b) by 971 days.

(21) Appl. No.: 17/049,467

(22) PCT Filed: Apr. 22, 2019

(86) PCT No.: PCT/US2019/028457
§ 371 (c)(1),
(2) Date: Oct. 21, 2020

(87) PCT Pub. No.: WO2019/209683
PCT Pub. Date: Oct. 31, 2019

(65) Prior Publication Data
US 2021/0246922 A1     Aug. 12, 2021

Related U.S. Application Data

(60) Provisional application No. 62/661,205, filed on Apr. 23, 2018.

(51) Int. Cl.
*E04C 2/54* (2006.01)
*F16B 5/01* (2006.01)
*F16B 5/02* (2006.01)
*F16B 11/00* (2006.01)

(52) U.S. Cl.
CPC .................. *F16B 5/01* (2013.01); *F16B 5/02* (2013.01); *F16B 11/006* (2013.01)

(58) Field of Classification Search
CPC ............. F16B 5/01; F16B 5/02; F16B 11/006
See application file for complete search history.

(56) References Cited

U.S. PATENT DOCUMENTS

| | | |
|---|---|---|
| 2,351,529 A | 6/1944 | Luxenberger et al. |
| 2,607,447 A | 8/1952 | Tuttle |
| 2,642,624 A | 6/1953 | Marvin |
| 2,780,946 A | 2/1957 | McGuire |
| 3,319,703 A | 5/1967 | Heim |
| 3,354,591 A | 11/1967 | Fuller |

(Continued)

FOREIGN PATENT DOCUMENTS

WO         0009307 A2     2/2000

OTHER PUBLICATIONS

International Search Report and Written Opinion mailed Jul. 17, 2019 (PCT/US2019/028457).

(Continued)

*Primary Examiner* — Basil S Katcheves
(74) *Attorney, Agent, or Firm* — Alix, Yale & Ristas, LLP

(57) ABSTRACT

A system, comprising a panel comprising a tetrahedral-octahedral honeycomb lattice, a skin layer formed on a first side of the lattice, having an aperture formed therein configured to receive a fastener, and a fastening assembly comprising a fastener configured to be mounted to the panel when the panel is fixed to an adjacent component, and a hardening material. Corresponding systems and methods also are disclosed.

18 Claims, 10 Drawing Sheets

(56) References Cited

U.S. PATENT DOCUMENTS

| | | | |
|---|---|---|---|
| 3,355,850 A * | 12/1967 | Rohe | F16B 39/34 |
| | | | 52/793.1 |
| 3,564,798 A | 2/1971 | Darby et al. | |
| 3,642,566 A * | 2/1972 | Figge | B32B 3/12 |
| | | | 156/196 |
| 3,645,833 A | 2/1972 | Figge | |
| 3,657,059 A | 4/1972 | Figge | |
| 3,689,345 A * | 9/1972 | Figge et al. | B31D 5/04 |
| | | | 428/116 |
| 3,811,645 A | 5/1974 | Feist | |
| 3,828,515 A * | 8/1974 | Galgoczy | F16B 5/02 |
| | | | 403/279 |
| 3,884,006 A * | 5/1975 | Dietlein | F16B 5/01 |
| | | | 411/968 |
| 3,899,805 A * | 8/1975 | McMillan | A44B 18/0053 |
| | | | 24/584.1 |
| 3,914,486 A | 10/1975 | Borgford | |
| 3,932,106 A | 1/1976 | Vogts | |
| 4,020,205 A | 4/1977 | Haselbauer | |
| 4,158,537 A | 6/1979 | Cuff et al. | |
| 4,241,117 A | 12/1980 | Figge | |
| 4,348,442 A * | 9/1982 | Figge | E04C 2/3405 |
| | | | 428/179 |
| 4,495,237 A * | 1/1985 | Patterson | E04C 2/3405 |
| | | | 156/291 |
| 4,650,385 A * | 3/1987 | Jackson | F16B 5/02 |
| | | | 403/29 |
| 4,711,062 A * | 12/1987 | Gwilliam | E04B 1/19 |
| | | | 52/81.3 |
| 4,717,612 A | 1/1988 | Shackelford | |
| 4,812,193 A * | 3/1989 | Gauron | F16B 13/141 |
| | | | 264/261 |
| 4,838,176 A | 6/1989 | Bowser, Sr. et al. | |
| 4,923,544 A | 5/1990 | Weisse | |
| 4,967,533 A | 11/1990 | Weisse | |
| 4,973,208 A | 11/1990 | Gauron | |
| 4,981,735 A * | 1/1991 | Rickson | F16B 39/225 |
| | | | 428/338 |
| 5,005,800 A | 4/1991 | Weisse | |
| 5,040,966 A * | 8/1991 | Weisse | B29C 33/42 |
| | | | 249/176 |
| 5,070,673 A * | 12/1991 | Weisse | E04C 2/326 |
| | | | 428/116 |
| 5,071,331 A | 12/1991 | Falco | |
| 5,093,957 A * | 3/1992 | Do | E04C 2/365 |
| | | | 52/793.1 |
| 5,240,543 A | 8/1993 | Fetterhoff et al. | |
| 5,266,379 A | 11/1993 | Schaeffer et al. | |
| 5,300,263 A | 4/1994 | Hoopman et al. | |
| 5,373,674 A * | 12/1994 | Winter, IV | E04C 2/288 |
| | | | 52/309.9 |
| 5,542,777 A | 8/1996 | Johnson | |
| 5,612,117 A * | 3/1997 | Belanger | E04C 2/3405 |
| | | | 428/76 |
| 5,653,078 A * | 8/1997 | Kies | E04B 1/4121 |
| | | | 49/504 |
| 5,690,035 A * | 11/1997 | Hatayama | B61D 17/185 |
| | | | 105/409 |
| 5,759,592 A | 6/1998 | Piramoon et al. | |
| 5,906,839 A | 5/1999 | Miura et al. | |
| 5,919,493 A | 7/1999 | Sheppard et al. | |
| 5,930,970 A * | 8/1999 | De Le fevre | E04G 9/05 |
| | | | 52/630 |
| 6,026,527 A | 2/2000 | Pearce | |
| 6,200,664 B1 * | 3/2001 | Figge | F42B 39/16 |
| | | | 428/920 |
| 6,264,412 B1 * | 7/2001 | Nakamura | F16B 5/01 |
| | | | 411/546 |
| 6,293,779 B1 | 9/2001 | Firmin | |
| 6,413,458 B1 | 7/2002 | Pearce | |
| 6,451,235 B1 | 9/2002 | Owens | |
| 6,488,460 B1 * | 12/2002 | Smith | F16B 5/0208 |
| | | | 411/339 |
| 6,543,755 B2 | 4/2003 | Monson et al. | |
| 6,641,897 B2 | 11/2003 | Gervasi | |
| 6,749,418 B2 | 6/2004 | Muirhead | |
| 6,875,298 B2 | 4/2005 | Ickinger | |
| 7,060,213 B2 | 6/2006 | Pearce | |
| 7,076,822 B2 | 7/2006 | Pearce | |
| 7,229,578 B2 | 6/2007 | Johnson et al. | |
| 7,591,114 B2 | 9/2009 | Herron, III | |
| 7,802,953 B2 * | 9/2010 | Stephen | F16B 37/12 |
| | | | 411/303 |
| 8,157,608 B1 | 4/2012 | Stapleton | |
| 8,297,169 B2 * | 10/2012 | Kunda | F16B 5/025 |
| | | | 89/36.11 |
| 8,449,707 B2 | 5/2013 | Simmons et al. | |
| 8,460,042 B2 | 6/2013 | Conner, Jr. | |
| 8,628,321 B2 | 1/2014 | Jenkins et al. | |
| 8,640,428 B2 | 2/2014 | Naik et al. | |
| 8,650,756 B2 * | 2/2014 | Wadley | B21D 47/00 |
| | | | 29/897 |
| 8,714,633 B2 | 5/2014 | Wary | |
| 8,745,958 B2 | 6/2014 | Kang et al. | |
| 9,140,440 B2 | 9/2015 | Jang | |
| 9,230,227 B2 | 1/2016 | Muirhead | |
| 9,234,536 B2 | 1/2016 | Truong et al. | |
| 9,301,411 B2 | 3/2016 | Shin et al. | |
| 9,361,553 B1 | 6/2016 | Ito | |
| 9,405,043 B2 | 8/2016 | Isurugi et al. | |
| 9,446,488 B2 * | 9/2016 | Coronado | F16B 37/122 |
| 9,597,826 B2 * | 3/2017 | Mishra | B32B 3/12 |
| 9,701,100 B2 | 7/2017 | Al Jishi et al. | |
| 9,731,470 B2 | 8/2017 | Dietz et al. | |
| 9,745,736 B2 * | 8/2017 | Wadley | C23C 8/22 |
| 9,815,546 B2 | 11/2017 | Mizuno et al. | |
| 10,730,604 B2 * | 8/2020 | Lewis | H02G 3/22 |
| 2005/0158573 A1 * | 7/2005 | Elzey | F03G 7/065 |
| | | | 428/593 |
| 2006/0010831 A1 * | 1/2006 | Skakie | E04B 2/8647 |
| | | | 52/794.1 |
| 2008/0226413 A1 * | 9/2008 | Stephen | F16B 5/0208 |
| | | | 411/103 |
| 2008/0289274 A1 | 11/2008 | Dobbin et al. | |
| 2009/0286100 A1 * | 11/2009 | Wadley | B21D 47/00 |
| | | | 29/897.31 |
| 2010/0086377 A1 * | 4/2010 | de Mola | F16B 5/0258 |
| | | | 411/176 |
| 2011/0111080 A1 | 5/2011 | Wang et al. | |
| 2014/0352870 A1 | 12/2014 | Kanai et al. | |
| 2016/0046095 A1 | 2/2016 | Clough et al. | |
| 2016/0115822 A1 | 4/2016 | Cortequisse | |
| 2017/0029968 A1 | 2/2017 | Wadley et al. | |
| 2017/0036750 A1 * | 2/2017 | Lewis | B64C 1/12 |
| 2017/0253006 A1 * | 9/2017 | Lopez | B32B 3/266 |
| 2017/0284434 A1 * | 10/2017 | Lopez | F16B 5/01 |

OTHER PUBLICATIONS

Deshpande, V.S. et al., "Effective properties of the octet-truss lattice material," Journal of the Mechanics and Physics of Solids, vol. 49, p. 1747-69 (2001).

Meza, Lucas R. et al., "Strong, lightweight, and recoverable three-dimensional ceramic nanolattices," Science, vol. 345, issue 6202, p. 1322-26 (Sep. 12, 2014).

International Search Report and Written Opinion mailed Sep. 13, 2018 for International Patent Application No. PCT/US2018/028801.

Contuzzi, Nicola et al., "Manufacturing and Characterization of 18Ni Marage 300 Lattice Components by Selective Laser Melting," Materials, 6(8), 3451-3468 (2013).

Gilmour, Andrew et al., "3D Printing of Functional Parts and Their Structural Integrity," Final Report, University of Strathclyde Engineering, Department of Mechanical & Aerospace Engineering, Mar. 2016, available at https://strath3dprinting.wixsite.com/strath3dprinting (PDF version is not available).

* cited by examiner

FASTENING SYSTEM, AND METHODS OF MAKING AND USING THE SYSTEM

RELATED APPLICATIONS

This application claims priority from U.S. Provisional Patent Application No. 62/661,205 filed Apr. 23, 2018.

BACKGROUND

Honeycomb sandwich core materials typically are made from hexagonal honeycomb lattice disposed between two solid, thin panels. It can be challenging and expensive to attach structures or hardware to such panels using load bearing fasteners. The honeycomb itself is perpendicular to the sandwich skins and is comprised of hollow cells so the strength of a directly attached fastener is inherently limited to the skin strength. Filling a cell or group of cells with epoxy or other filler is inherently weak and strength is limited because of the thinness of the honeycomb walls. Known fastening methods often require cutting out sections of the honeycomb panel, and/or drilling the honeycomb core at an angle to provide support for fillers into which fasteners can be affixed when the panel is fixed to an adjacent structure.

One conventional solution, disclosed in U.S. Pat. No. 8,640,428, incorporates insert assemblies having a high specific strength in order to reduce stress concentrations at specific locations on the sandwich panels. The insert assemblies have a relatively complex configuration in that they include four functional components, namely the insert, a potting material, an upper face plate and a lower face plate. U.S. Pat. No. 9,234,536 describes a fastener receptacle that reduces the number of parts required for mounting an object to a component such as a panel of honeycomb core material. The receptacle includes an outer housing and a floating insert positioned within the outer housing that is configured to receive a fastener.

It would be useful to develop an improved system for fastening components to core material.

SUMMARY

One embodiment described herein is a system including a panel comprising a tetrahedral-octahedral honeycomb lattice, a skin layer formed on a first side of the lattice having an aperture formed therein configured to receive a fastener, and a fastening assembly. The fastening assembly comprises a fastener configured to be mounted to the panel when the panel is fixed to an adjacent component, and a filler. In some cases, the fastening assembly includes a fastener insert. In embodiments, the fastener is configured to be mounted to the panel when the panel is fixed to at least one of the skin layer and a component adjacent to the skin layer.

Another embodiment described herein is a method comprising obtaining a panel comprising a tetrahedral-octahedral honeycomb lattice and a skin layer, obtaining a fastening assembly comprising a fastener and a filler, and optionally comprising a fastener insert, forming an opening in the panel configured to receive the fastening assembly, positioning the panel adjacent to a component, and fixing the panel to the component using the fastening assembly. In some cases, the fastener is positioned in a fastener insert.

DETAILED DESCRIPTION

Figure 1:
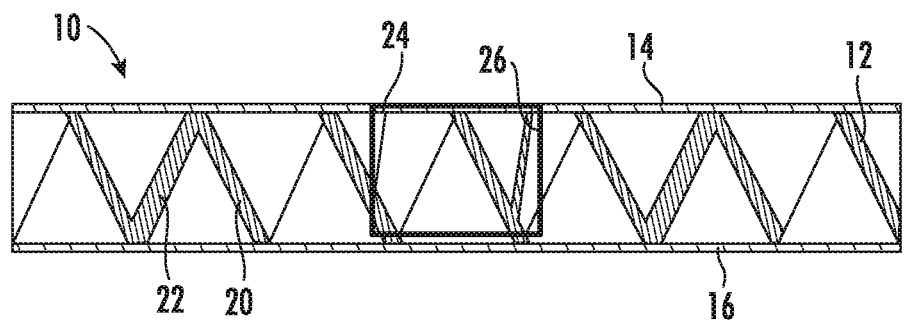
FIG. 1 shows a side sectional view of a tetrahedral-octahedral honeycomb lattice with a section designated for receiving a first type of fastener assembly.

While past efforts to fasten conventional honeycomb core material to adjacent components have focused on adapting the fastener to work with the geometry of the conventional honeycomb material, the system described herein takes a different approach. Instead, in the embodiments disclosed herein, the geometry of the core material is revised to enhance the fastening strength and useful life of the fastening system.

The configuration of tetrahedral-octahedral honeycomb lattice core material provides a geometric framework that can work cooperatively with a fastener system. In embodiments, the combination of the support provided by angled walls of the tetrahedral lattice structure, and the support provided by the adhesive, other hardening material which hardens to form a sturdy geometric shape, or pre-formed pyramidal shapes that are installed, results in a system having excellent connective strength and stability when the core material is attached to another component.

As used herein, the term "filler" refers to a hardening filler, which may be a potting material such as an epoxy, silicone or urethane, or another material that becomes sufficiently hard to support a fastener insert and/or a fastener. Additionally, the "filler" can be a rigid, pre-formed three-dimensional component having a generally pyramidal shape that is configured to surround a fastener insert and/or a fastener and is in the form of a solid at the time it is inserted into the lattice. In one embodiment, two pyramids are inserted from opposite sides of the lattice and are adhered to one another and to the interior walls of the lattice to support the fastener insert and/or fastener.

In embodiments, a hardening filler is injected into an octagonal and/or an upwardly-pointed tetrahedral cavity (relative to the fastener entry point) and a suitable fastening location has been created to receive the appropriate fastener. The fastener and its filler-base are bonded into a geometrically supportive core space which is further strengthened by the one or more skin laminates.

In another embodiment, a hardening filler is injected to an octagonal cavity through an opening in the top of a lattice and an opening in the bottom of the lattice, and a fastener insert is held in place by the filler.

Another embodiment comprises inserting pyramids (one diagonally inserted from the top and one diagonally inserted from the bottom such that their square bases are adjacent after insertion and together comprise an octahedron) of a fill material and bonding agent which in combination are suitable to receive a fastener so as to fill the octahedral cavity at the point intended to receive the fastener prior to lamination of the skin onto the core. (For further details on the use of pyramids to fill octahedral voids in a tetrahedral-octahedral honeycomb lattice see U.S. Provisional Patent Application No. 62/489,060 filed Apr. 24, 2017 and International Application No. PCT/US2018/028801, the contents of which are incorporated herein in their entirety.)

Another embodiment comprises removal of the skin layer above and below an octahedral space of the lattice, inserting pyramids (one diagonally inserted from the top and one diagonally inserted from the bottom such that their square bases are adjacent after insertion and together comprise an octahedron) to fill it with material and a bonding agent suitable to receive a fastener. In this embodiment, the pyramidal shape could be altered such that after insertion, the triangular faces of the pyramids parallel to the top and bottom skins could be configured to be flush with the skin's surface after insertion.

In another embodiment, the mold for the lattice is built to allow for material to fill predetermined lattice cavities at the time of molding in locations suitable to receive the fasteners.

In some cases, the openings to receive the fastener and/or insert are formed in the lattice at the time the lattice is manufactured. In other cases, after the skins are laminated, holes are drilled at the fastener location, filled with a hardening material, and then the fasteners are inserted before the hardening material is substantially cured. In some cases, the skins have marks showing where the holes are to be drilled, or where the lattice has pre-formed openings.

The hardening material can be tailored to the fastener and the desired strength and weight characteristics. Because the geometric framework into which the fastener receiving filler is deposited is comprised of angular tetrahedra and/or octahedra, the filler is retained by the geometry of the core. This enables the use of a variety of fillers to receive the fastener including foams, composite wood, thermoset plastics, or metals like aluminum. Importantly, the strength of the fastener is not limited by a mechanical bond but only by the geometry of the core, the strength of the laminated core structure and the strength of the filler material.

Figure 2:
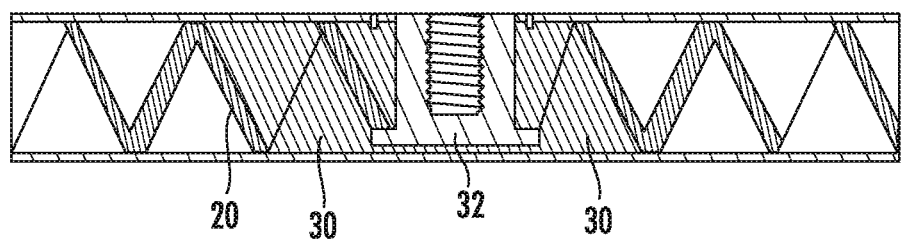
FIG. 2 shows a side sectional view of the lattice of FIG. 1 with the first type of fastener assembly mounted therein.
Figure 3:
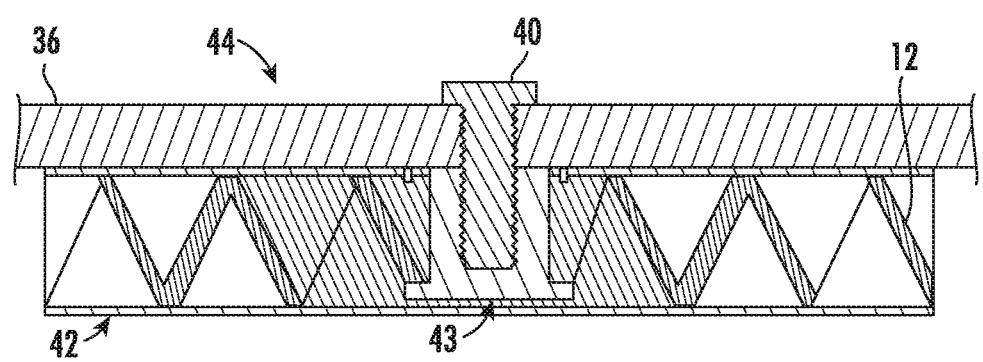
FIG. 3 shows a side sectional view of the lattice of FIG. 1 fixed to a solid, flat panel.

Referring to the drawings, FIGS. 1-3 show a side sectional view of a tetrahedral-octahedral honeycomb sandwich core prior to insertion of a fastener. The sandwich core is generally designated as 10 and includes a lattice 12 having the three dimensional structure shown in FIG. 6. As is shown in FIG. 1, first skin layer 14 and second skin layer 16 are mounted on, or disposed adjacent to, opposite sides of the lattice 12. The skin layers 14, 16 can be attached to the lattice 12 by any suitable means, including lamination, adhesion, and the like. The skin layers 14, 16 can be attached to the lattice before the sandwich core 10 is fastened to another component, or concurrently during fastening of the sandwich core 10 to another component.

The lattice 12 comprises a Tetrahedral-Octahedral Honeycomb Lattice Core. In embodiments, the core is a one-piece component. The negative space between the intersecting slats comprising the lattice are alternating rows of tetrahedra and octahedra. The rows of tetrahedra alternate between being pointed upwards and pointed downwards. These alternating rows of tetrahedra and octahedra form a tetrahedral-octahedral tessellation as the width of the lattice slats converges on 0. Conversely, as the space between the platonic solids forming the tetrahedral-octahedral tessellation is expanded, material can be injected or otherwise inserted into the space to form a Tetrahedral-Octahedral Honeycomb Lattice. The Lattice that is formed makes a highly desirable, quasi-isotropic, rigid core material. Importantly, the core geometry is inherently rigid, independent of being sandwiched between surface and base layers in a laminate structure. So as a result, it can enhance the rigidity of a composite laminate when used as a core, versus other core materials structured around alternative geometries.

Referring to FIGS. 1-3, the lattice 12 has a plurality of diagonal walls 20, 22, the surfaces of which define the tetrahedral and octahedral spaces. After an opening 24 has been formed in the first skin layer 14 and an opening 26 has been formed or selected in the lattice 12, with both openings having dimensions suitable to receive a fastener assembly, a hardening material 30 in liquid or molten form is deposited into the lattice through the openings 24, 26. A fastening insert 32 is then inserted in the openings 24, 26. After a component 36 which is to be joined to the sandwich core 10 has been positioned adjacent to the sandwich core, 10, a fastener 40 is positioned in the fastening insert 32. The hardening material then hardens and in many cases, turns to a solid. In FIG. 3, the system that includes the fastener 40, fastener insert 32, sandwich core 10 and hardening material 30 is designated as 42. The system that includes the fastener 40, fastener insert 32, sandwich core 10, hardening material and component 36 adjacent to the sandwich core 10 is designated as 44. The fastener assembly 43 includes the fastener insert 32 and the fastener 40.

In some cases, the opening 26 in the lattice is already present, as when the cell size of the lattice is sufficiently large to accommodate the fastener or fastener insert, and the desired position of the fastener is within a particular cell. In other cases, the opening 26 is cut in the lattice in a size suitable to receive the fastener insert or the fastener itself if no insert is used.

As shown in FIG. 3, a threaded fastener 40 can be used. Depending on the structure and use of the sandwich core material, non-threaded fasteners also can be used in some configurations.

Figure 4:
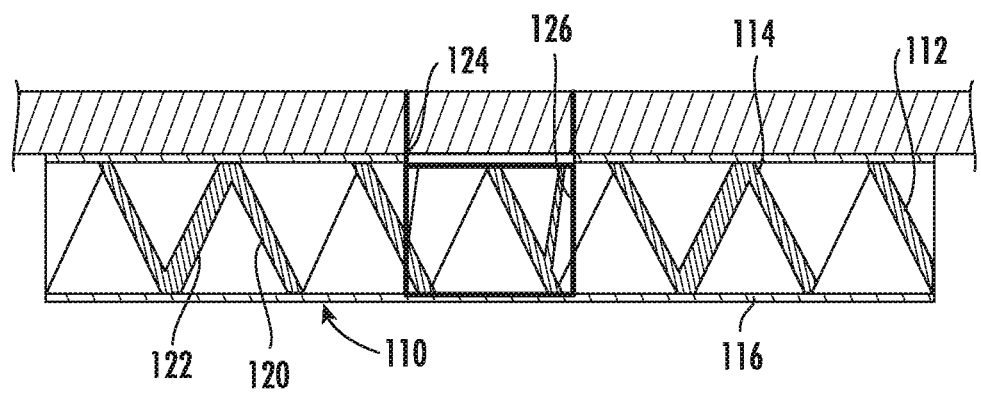
FIG. 4 shows a side sectional view of a tetrahedral-octahedral honeycomb lattice with a section designated for receiving a second type of fastener.
Figure 5:
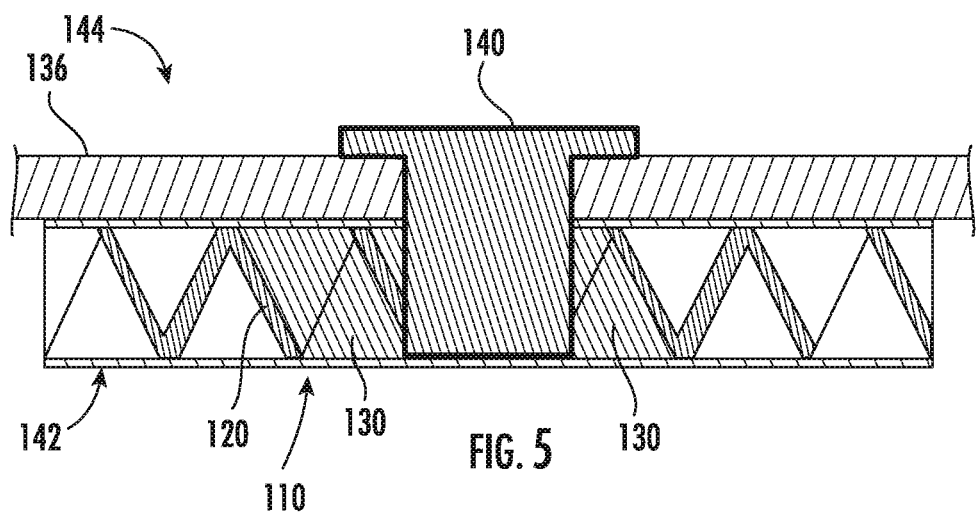
FIG. 5 shows a side sectional view of the lattice of FIG. 1 with the second type of fastener mounted therein with the lattice fixed to a solid, flat panel.

FIGS. 4-5 show a second embodiment in which no fastener insert is used.

Instead, the fastener is mounted directly into the sandwich core. In this embodiment, FIG. 4 shows a side sectional view of a tetrahedral-octahedral honeycomb sandwich core prior to insertion of a fastener, but with a component 136 resting on top of the sandwich core. The sandwich core is generally designated as 110 and includes a lattice 112 having the three dimensional structure shown in FIG. 6. As is shown in FIG. 4, first skin layer 114 and second skin layer 116 are mounted on, or disposed adjacent to, opposite sides of the lattice 112. The skin layers 116 can be attached to the lattice 112 by any suitable means, including lamination, adhesion, and the like. The skin layer 114 can be attached to the lattice before the sandwich core 110 is fastened to another component, or concurrently during fastening of the sandwich core 110 to component 136.

The lattice 112 comprises a Tetrahedral-Octahedral Honeycomb Lattice Core. In some cases, the lattice core is a one-piece component. As with the embodiment shown in FIGS. 1-3, the negative space between the intersecting slats comprising the lattice are alternating rows of tetrahedra and octahedra. The rows of tetrahedra alternate between being pointed upwards and pointed downwards.

Referring to FIGS. 4-5, the lattice 112 has a plurality of diagonal walls 120, 122, the surfaces of which define the tetrahedral and octahedral spaces. After an opening 124 has been formed in the first skin layer 114 and an opening 126 has been formed or selected in the lattice 112, with both openings having dimensions suitable to receive a fastener assembly, a hardening material 130 in liquid or molten form is deposited into the lattice through the openings 124, 126. A fastener 140 is then inserted in the openings 124, 126. After a component 136 which is to be joined to the sandwich core 110 has been positioned adjacent to the sandwich core, 110, a fastener 140 is positioned in the openings 124, 126. The hardening material 130 then hardens and in many cases, turns to a solid. In FIG. 5, the system that includes the fastener 140, sandwich core 110 and hardening material 130 is designated as 142. The system that includes the fastener 140, sandwich core, hardening material and component 136 adjacent to the sandwich core 110 is designated as 144.

In some cases, the opening 126 in the lattice is already present, as when the cell size of the lattice is sufficiently large to accommodate the fastener or fastener insert, and the desired position of the fastener is within a particular cell. In other cases, the opening 126 is cut in the lattice in a size suitable to receive the fastener insert or the fastener itself if no insert is used.

In embodiments, the hardening material 30, 130 is an adhesive. In some cases, the hardening material is a potting material that absorbs vibration. The potting material can be a solid or gel after hardening, usually by setting, cooling or curing. In most cases, the hardening material is a liquid or melt at the time of insertion in the lattice. The angular configuration of the tetrahedral-octahedral structure imparts to the hardened filler material a particularly advantageous geometric structure to prevent the fastener from loosening.

Figure 6:
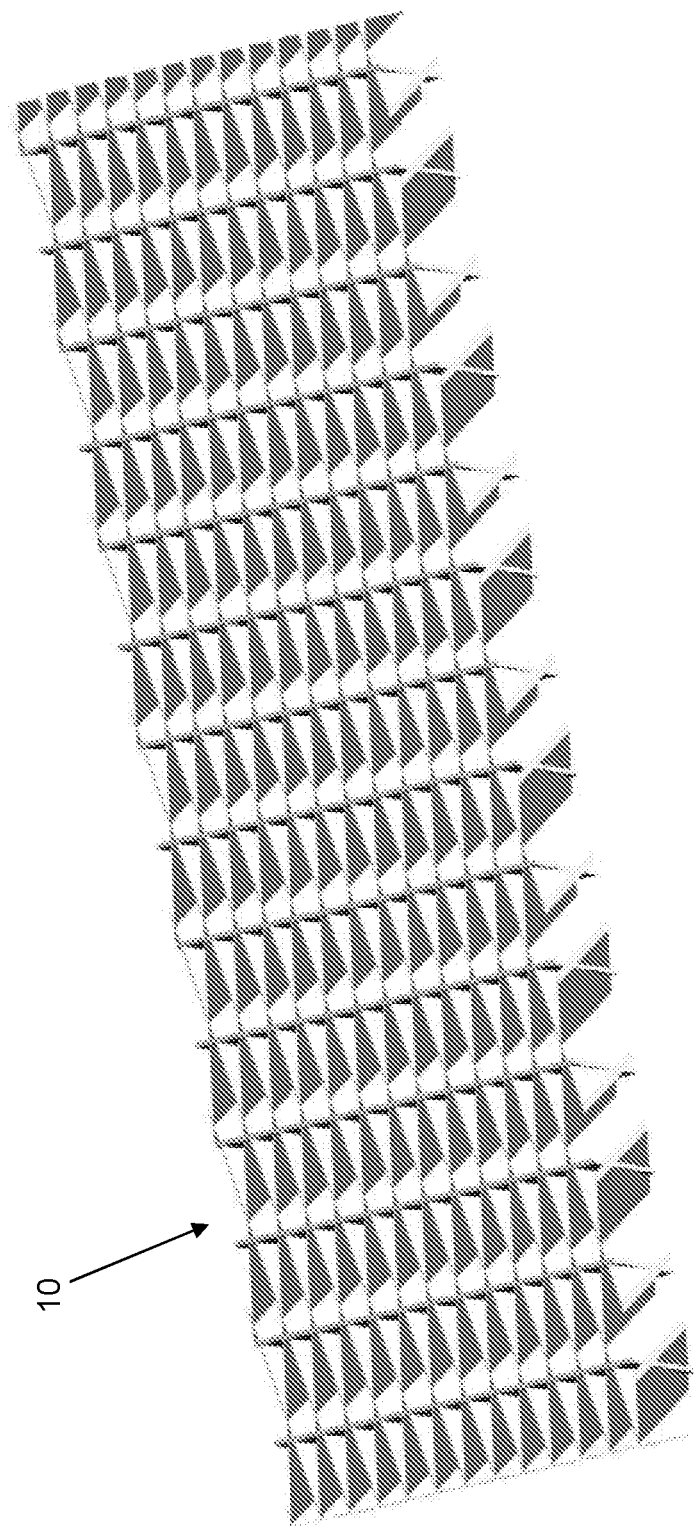
FIG. 6 depicts a tetrahedral-octahedral honeycomb lattice that can receive the fastener assemblies and fasteners of FIGS. 1-5.
Figure 7:
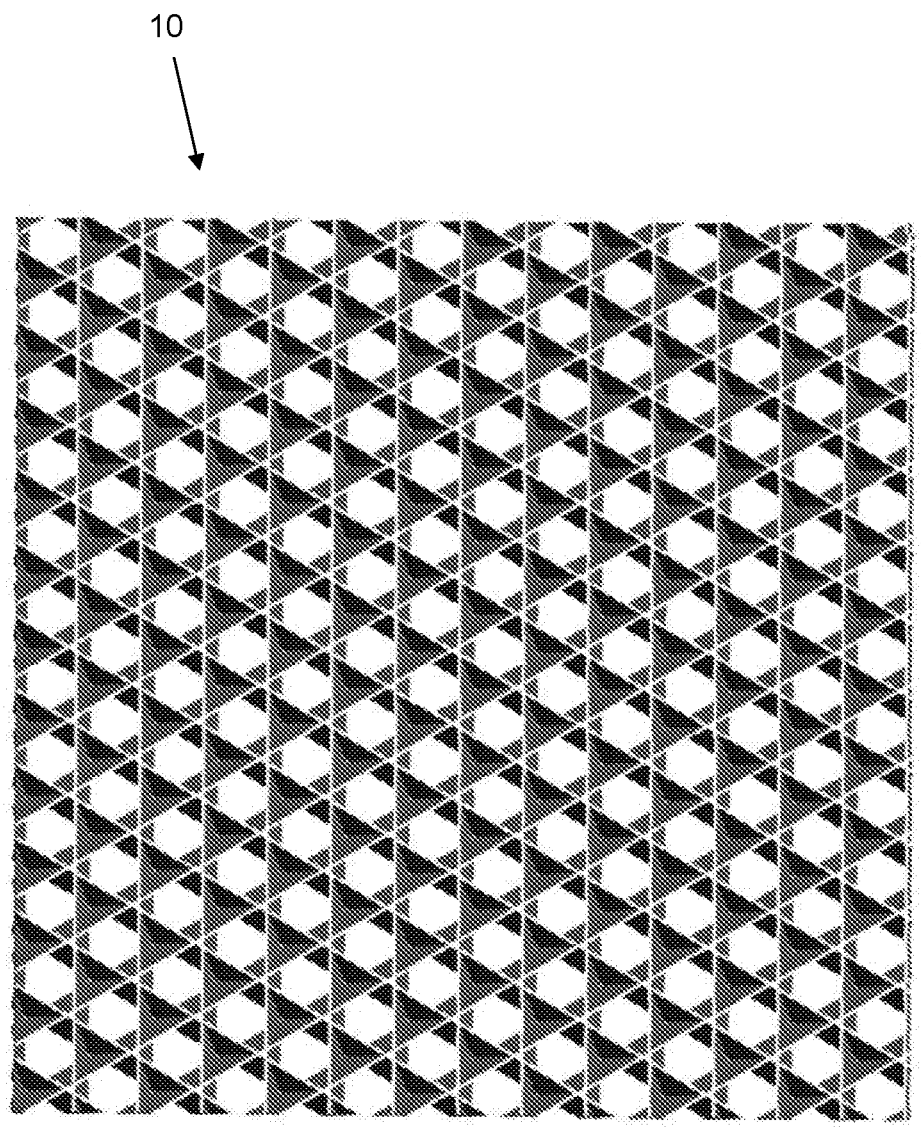
FIG. 7 shows a top plan view of a tetrahedral-octahedral honeycomb lattice that can be cut to receive a fastener assembly or fastener.

FIGS. 6-7 show embodiments of tetrahedral-octahedral lattices that can be used in the fastening system described herein. Further descriptions of these lattices and method for making the lattices can be found in commonly assigned International Application No. PCT/US2018/028801, the contents of which are incorporated herein in their entirety.

Figure 8:
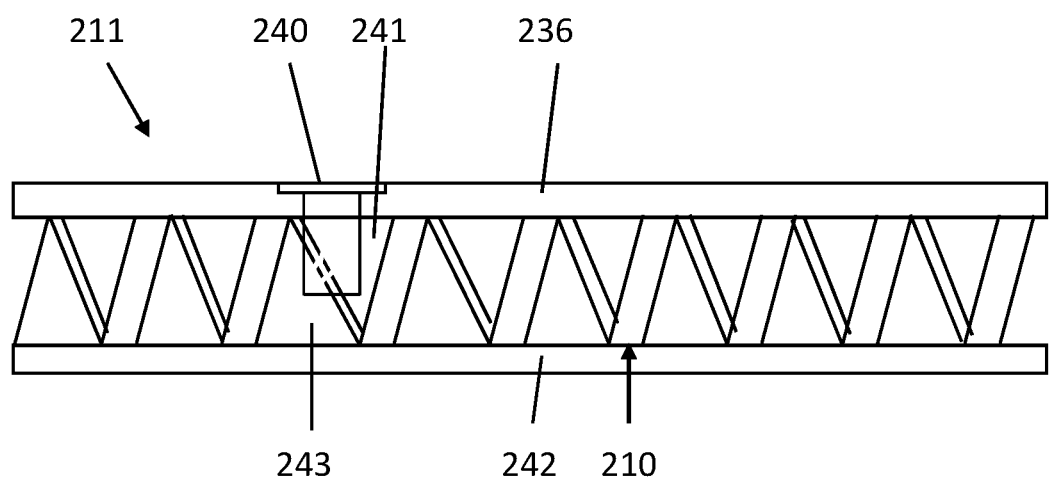
FIG. 8 shows a lattice in which a filler material is deposited into the octahedral space before the top skin layer is placed on the lattice.

FIG. 8 shows a system 211 in which a lattice core 210 has solid pyramids 241, 243 that are incorporated into a lattice before the top skin layer 236 and bottom skin layer 242 are formed on the top and bottom of the lattice. In embodiments, the pyramids are made of a composite material that assists in spreading the load of a fastener that is to be deposited in the insert 240. In embodiments, the insert has a central bore with a threaded inner wall.

Figure 9:
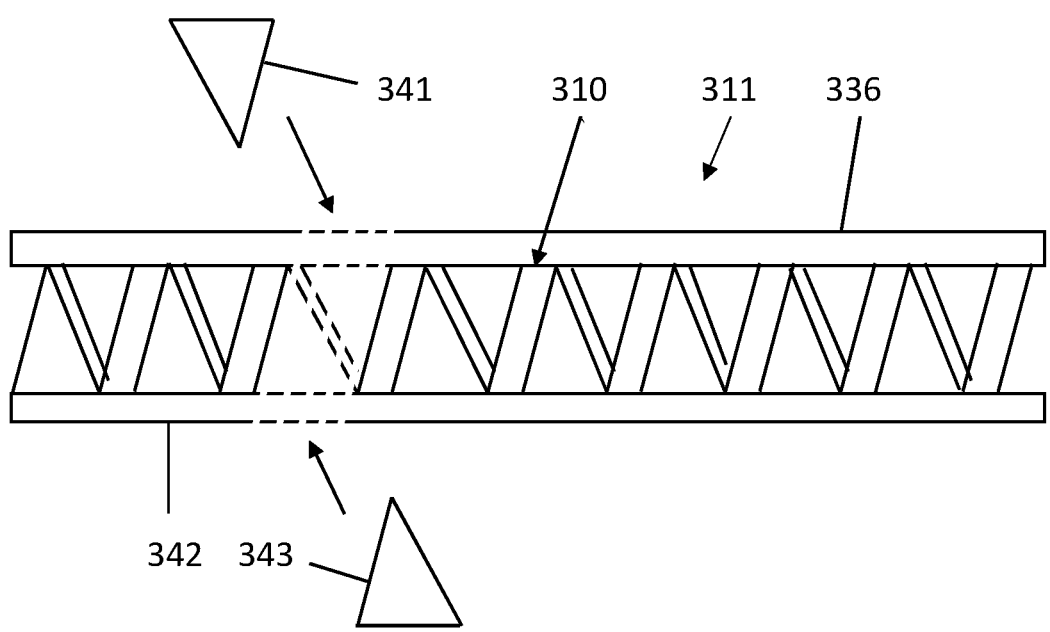
FIG. 9 schematically shows a method of filling a tetrahedral-octahedral honeycomb lattice with pyramids configured to receive a fastener.

FIG. 9 shows a system 311 in which a lattice core 310 has solid pyramids 341, 343 incorporated into the lattice after the top skin layer 336 and bottom skin layer 342 are formed on the top and bottom of the lattice. In embodiments, the pyramids 341, 343 are made of a composite material that assists in spreading the load of a fastener to be deposited therein. In order to insert the pyramids, the skin layers 336, 342 are cut away in the cell in which the fastener is to be inserted.

Figure 10:
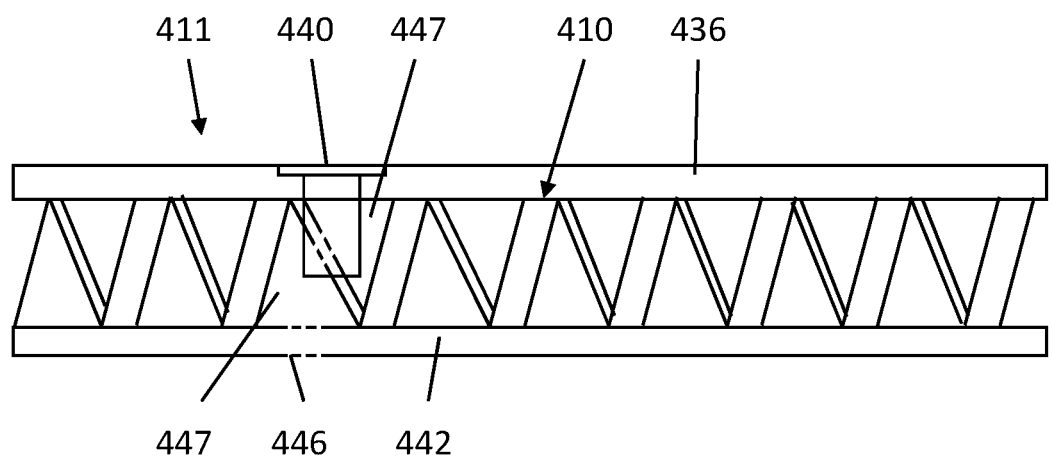
FIG. 10 shows an embodiment with a fastener insert contained within a potting material inserted from the bottom of the lattice, and also optionally from the top.

FIG. 10 shows a system 411 in which a lattice core 410 has a hardening material 447 injected as a liquid through a top hole in the lattice 410 and optionally also includes a bottom hole 446 for injection of hardening material. The hardening material is injected after the top skin layer 436 and bottom skin layer 442 are formed on the top and bottom of the lattice. In embodiments, the hardening material solidifies into a form that assists in spreading the load of a fastener that is to be deposited in the insert 440. In embodiments, the insert 440 has a central bore with a threaded inner wall.

Figure 11:
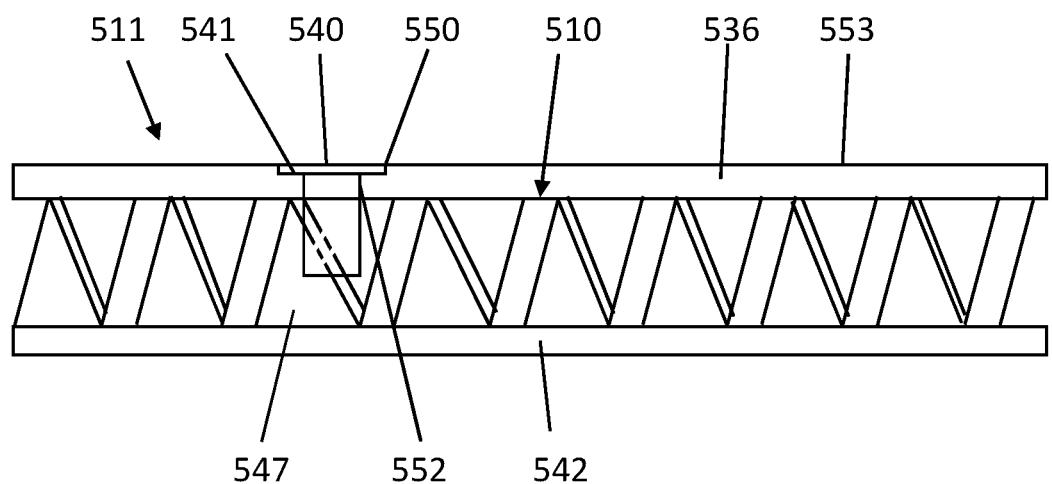
FIG. 11 shows an embodiment with a fastener insert contained within a potting material inserted from the top of the lattice.

FIG. 11 shows a system 511 in which a lattice core 510 has a hardening material 547 injected as a liquid through a top hole 552 in the lattice top skin layer 536. The hardening material is injected after the top skin layer 536 and bottom skin layer 542 are formed on the top and bottom of the lattice. The top skin layer has an upper opening 550 having a larger diameter than the hole 552 that conforms with the shape of the top portion 541 of the insert 540 in order that the top portion 541 of the insert 540 is flush with the outer surface 553 of the top skin layer 536. In embodiments, the hardening material solidifies into a form that assists in spreading the load of a fastener that is to be deposited in the insert 540. In embodiments, the insert 540 has a central bore with a threaded inner wall.

Figure 12:
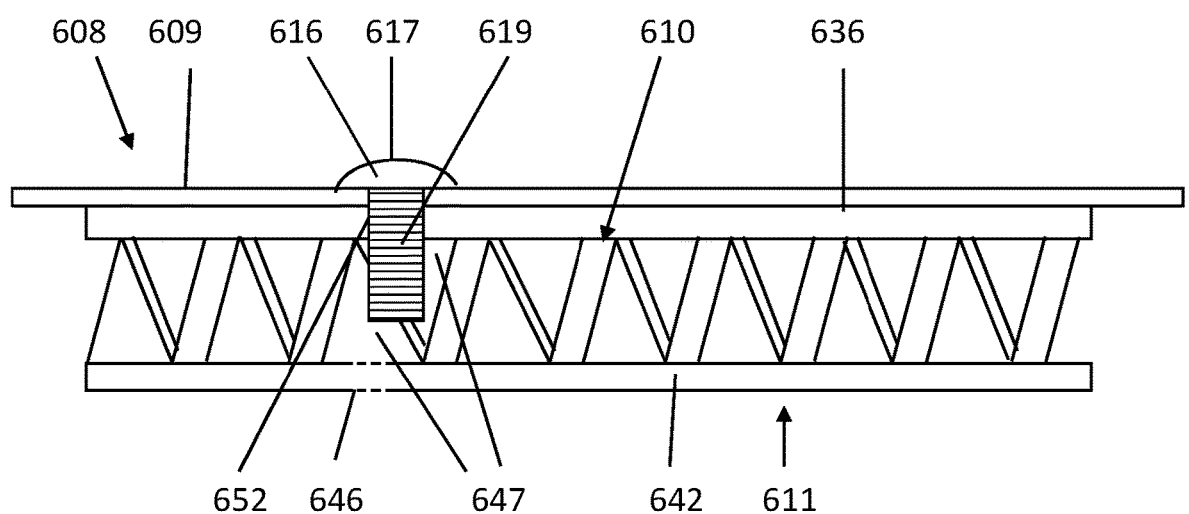
FIG. 12 shows an embodiment with a fastener directly contained within a potting material injected from the bottom of the lattice, and also optionally from the top.

FIG. 12 shows an assembly 608 including a panel 609 and a system 611 mounted thereto using a fastener 617 having a head 616 and a thread 619. In this embodiment, no insert is used. The lattice core 610 has a hardening material 647 injected as a liquid through a top hole 652 in the lattice top skin layer 636, and also through a bottom hole 646 in the bottom skin 642. The hardening material 647 is injected after the top skin layer 636 and bottom skin layer 642 are formed on the top and bottom of the lattice. In embodiments, the hardening material solidifies into a form that assists in spreading the load of the fastener 617.

Figure 13:
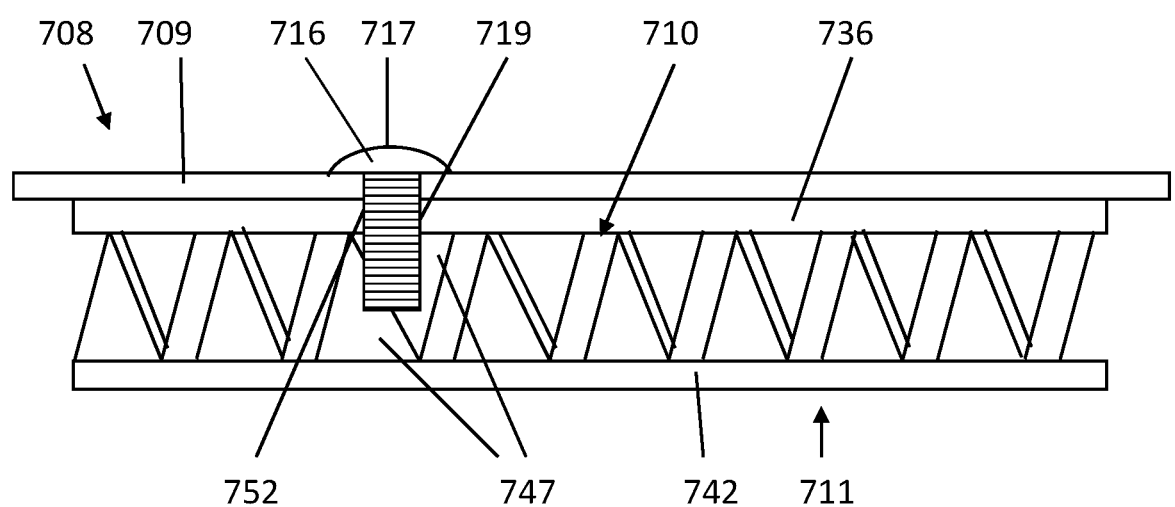
FIG. 13 shows an embodiment with a fastener directly contained within a potting material injected from the top of the lattice.

FIG. 13 shows an assembly 708 including a panel 709 and a system 711 mounted thereto using a fastener 717 having a head 716 and a thread 719. In this embodiment, no insert is used. The lattice core 710 has a hardening material 747 injected as a liquid through a top hole 752 in the lattice top skin layer 736. The hardening material 747 is injected after the top skin layer 736 and bottom skin layer 742 are formed on the top and bottom of the lattice. In embodiments, the hardening material solidifies into a form that assists in spreading the load of the fastener 717.

Non-limiting examples of suitable hardening materials include thermoplastic materials, thermoset materials, metals, metal alloys, and composites. In many cases, the hardening material is an adhesive. Non-limiting examples of adhesives include thermoset materials such as drying adhesives and pressure-sensitive adhesives. When an adhesive is used, the sandwich core is fixed to the adjacent component by a combination of mechanical fastening by the fastener and also chemical and/or physical bonding. In some embodiments, the adhesive is a thermosetting material, such as epoxy, that crosslinks as it hardens. In other cases, a solvent-based adhesive is used that hardens as the solvent evaporates.

Non-limiting examples of products that can be assembled or mounted using the fastening system described herein are handholds, handrails, door latches, door locks, door hinges, window casements, shelving, cabinets, molding, thermostats, light fixtures, communication outlets including but limited to cat5 receptacles, TV support brackets, computer support brackets, pictures, support hangers, magazine pouches, panels fixed to a substructure, panels fixed to other panels, laminate skins, strapping for wires, curtain rods, window blinds, flooring, plumbing fixtures, electrical conduits, power outlets, and power switches.

Non-limiting examples of fastener inserts and fasteners that can be used in the system include screws, nails, bolts, through bolts, staples, pins, rivets, retaining rings, splines, and additional adhesives. The inserts and fasteners may be threaded or non-threaded. The threaded inserts may be internally threaded, externally threaded, or both internally and externally threaded.

A number of alternatives, modifications, variations, or improvements therein may be subsequently made by those skilled in the art, which are also intended to be encompassed by the following claims.

What is claimed is:

1. A system, comprising:
   a panel comprising a tetrahedral-octahedral honeycomb lattice including a plurality of solid walls defining alternating rows of tetrahedral spaces and octahedral spaces with the tetrahedral spaces being adjacent to the octahedral spaces, the lattice being molded in one piece,
   a first skin layer connected to a first side of the lattice, having an aperture formed therein configured to receive a fastener, and
   a fastening assembly comprising a fastener configured to be mounted to the panel when the panel is fixed to an adjacent component, and a filler.

2. The system of claim 1, wherein the fastener is a threaded fastener.

3. The system of claim 1, wherein the fastener is a non-threaded fastener.

4. The system of claim 1, wherein the fastening assembly further comprises a fastener insert configured to receive the fastener.

5. The system of claim 1, wherein the filler comprises a hardening material.

6. The system of claim 5, wherein the hardening material comprises an adhesive.

7. The system of claim 6, wherein the hardening material comprises a potting material.

8. The system of claim 5, wherein the adhesive comprises a potting material.

9. The system of claim 1, wherein the panel comprises a sandwich panel with a second skin layer formed on a second side of the lattice opposite to the first side.

10. The system of claim 1, wherein the filler is configured to assist in spreading a load exerted on the fastener when the fastener is connected to a panel.

11. The system of claim 10, wherein the filler comprises at least one of an epoxy, a silicone and a urethane.

12. The system of claim 1, wherein the fastening assembly further comprises a fastener insert configured to receive the fastener.

13. The system of claim 1, wherein the filler comprises first and second pyramids positioned such that their square bases are adjacent and together comprise an octahedron, so as to fill the octahedral cavity at a location intended to receive the fastener.

14. A system, comprising:
   a panel comprising a tetrahedral-octahedral honeycomb lattice including a plurality of solid walls defining tetrahedral spaces and adjacent octahedral spaces with the tetrahedral spaces being adjacent to the octahedral spaces, the lattice being molded in one piece,
   first and second skin layers connected to opposite sides of the lattice, and
   a fastening assembly comprising a fastener configured to be mounted to the panel when the panel is fixed to an adjacent component, and a filler,
   wherein the filler comprises first and second pyramids.

15. The system of claim 14, wherein the filler is configured to assist in spreading a load exerted on the fastener when the fastener is connected to a panel.

16. The system of claim 15, wherein the filler comprises at least one of an epoxy, a silicone and a urethane.

17. The system of claim 14, wherein the fastening assembly further comprises a fastener insert configured to receive the fastener.

18. The system of claim 14, wherein the filler comprises a composite material and the first and second pyramids are positioned such that their square bases are adjacent and together comprise an octahedron, so as to fill the octahedral cavity at a location intended to receive the fastener.

* * * * *